3,496,060
FATTY ACID POLYAMIDE ADHESIVE FOR
BONDING CORK DISCS TO CROWN SHELLS
Donald R. Pitz, La Grange, and Alfred W. Kehe,
Berkeley, Ill., assignors to Continental Can Company, New York, N.Y., a corporation of New York
No Drawing. Filed Jan. 5, 1967, Ser. No. 607,395
Int. Cl. B32b 15/04
U.S. Cl. 161—211                               10 Claims

ABSTRACT OF THE DISCLOSURE

A container closure is constructed of a metal shell having a lacquer coating on the interior surface thereof and a cork liner disposed therein and bonded to the lacquered interior surface by an adhesive composition comprising a major amount of an amide reaction product prepared from heating a low molecular weight polyamine with a mixture of acids consisting of 4,4'-bis (hydroxyaryl) pentanoic acid and a dimer acid of a fatty acid having 18 to 22 carbon atoms.

BACKGROUND OF INVENTION

The field of invention

This invention relates to container closure elements and more particularly to metal closure seals having cork liners for sealing containers such as bottles and the like.

The prior art

In preparation of container closures such as crown shells, the inner surface of the metal crown shell is provided, during manufacturing, with a lacquer coating to protect the metal surface from atmospheric or other corrosion and to assist in preventing penetration of the contents of the container to the metal of the crown shell. To insure proper sealing of the crown shell to the container, a cork liner, composed of natural cork or composition cork, is inserted in the lacquered shell and caused to be bonded to the shell using an adhesive coating;

The adhesives usually employel in the art for bonding the cork liner to the lacquered shell interior, such as egg or blood albumin, although adequate for most purposes, suffer from the disadvantage that in the case of beverages and food products which are necessarily prepared and stored for some time before use by the consumer, deteriorate in bond strength and are subject to microbiological attack. On prolonged exposure to such food products as carbonated beverages, unsightly staining or blackening of the cork liner also results due to the reaction of the cork tannins with the metal corrosion products of the closure surface caused by excessive gas and liquid permeation of the adhesive.

SUMMARY OF THE INVENTION

The difficulties encountered with prior art adhesives are overcome with the present invention in that the cork liners have substantially greater adhesion to the lacquered shell inner surface when under the sealing pressures and atmosphere, and there is substantially no tendency for the adhesive to deteriorate or cause unsightly staining of the cork liner.

Briefly, the present invention consists in providing a closure for sealing containers comprising a metal shell having a lacquered interior surface, a cork liner disposed therein and bonded to the lacquered interior surface of the shell by an adhesive composition comprising a major amount (i.e., greater than 70% by weight) of an amide reaction product prepared by heating a low molecular weight aliphatic polyamine with a mixture of acids consisting of a 4,4'-bis (hydroxyaryl) pentanoic acid and a dimer acid of a fatty acid having 18 to 22 carbon atoms, the mole ratio of the polyamine to the mixture of acids being substantially 1:1, the resultant amide reaction product having an amine value less than 10 and an acid value less than 10, and the bis (hydroxyaryl) pentanoic acid comprising about 5% to about 30% by weight of the amide.

The adhesive amide composition is an effective binder to the cork and also adheres well to the lacquer coating. The adhesive is non-toxic and inert to all materials which are placed in containers having closure seals, e.g., it is not attacked by beer, cola drinks, or ginger ale. After prolonged exposure to these beverages, little or no staining of the cork liner is observed.

PREFERRED EMBODIMENTS

In practice, a metal closure having a lacquer coating applied to the interior thereof is preheated by any suitable means such as an oven to about 120° to about 150° C. The amide adhesive in the form of a melt heated to about 150° to about 180° C. is deposited in metered amounts in the interior of the closure shell. A cork liner in the shape of a ring or disc is positioned in this shell on top of the adhesive. Then a plunger or other suitable pressure means is engaged on top of the cork liner to force the cork liner into intimate contact with the adhesive amide to bond the cork liner to the metal shell which is thereafter allowed to cool.

The 4,4'-bis (hydroxyaryl) pentanoic acids, which are hereinafter referred to for convenience as diphenolic acid or DPA are known to the art e.g. U.S. 2,933,517 and consist of the condensation products of levulinic acid and phenol, substituted phenols and mixtures thereof, the hydroxyaryl radical being free from substitutes other than alkyl groups containing 1 to 5 carbon atoms. Examples of these acids include 4,4'-bis (4-hydroxyphenyl) pentanoic acid, 4,4'-bis (4-hydroxy-3-methyl phenyl) pentanoic acid, 4,4'-bis (4-hydroxybutyl phenyl) pentanoic acid and the like.

Polyamines useful in preparing the amide adhesive composition employed in the practice of the present invention include aliphatic polyamines having the general formula

wherein R is an alkylene group having 2 to 6 carbon atoms and x is an integer from 0 to 3. Examples of such aliphatic polyamines include ethylene diamine, propylene diamine, tetramethylene diamine, hexamethylene diamine, diethylene triamine, triethylene tetramine, tetramethylene pentamine and the like.

The fatty acids useful in the practice of the present invention include dimer acids of vegetable oil acids containing 18 to 22 carbon atoms, such as linseed oil fatty acids, soybean oil fatty acids, corn oil fatty acids, cottonseed oil fatty acids, safflower oil fatty acids, sunflower oil fatty acids, rapeseed oil fatty acids and the like.

Dimer and trimer acids are formed by the polymerization of unsaturated fatty acids of natural drying oils containing 18 to 22 carbon atoms at 300° C. The predominant reaction is polymerization by the bimolecular addition of unsaturated fatty acid radicals leading to the production of substituted monocyclic dibasic and bicyclic tribasic acid structures with 36 to 54 carbon atoms. The dimer acid isolated from this mixture is the type useful in the practice of the present invention.

The amide adhesive of the present invention may conveniently be prepared by methods of amidification well known to the art. In general, the amides are prepared by directly heating a mixture of DPA, a dimerized fatty acid, and an aliphatic polyamine at a temperature from 100° to 275° C. under conditions such that water produced during condensation is continuously removed as it is formed and a product having an acid value below 10 and an amine value below 10 is obtained.

An acid value represents the number of milligrams of KOH required to neutralize a 1-gram sample of the amide. An amine value represents the number of milligrams of HCl required to neutralize a 1-gram sample of the amide.

The amide adhesive composition used in the practice of the present invention may consist of the amide above or in admixture with minor amounts, i.e., less than 30% by weight, of other synthetic or natural resins and plasticizers.

Typical examples of suitable resins are phenol formaldehyde resins, ketone aldehyde resins, toluene sulfonamide resins, urea formaldehyde resins, phthalic alkyds, epoxies, terpenes, polyesters, polyacrylates and methacrylates, e.g., polymethyl methacrylate, polybutyl methacrylate, polymethyl acrylate, polyvinyl acetate, ethylene-acrylic acid copolymer, ethylene-vinyl acetate copolymer, pentaerythritol resins, pentaerythritol esters of rosins, glycerol esters of hydrogenated rosins, waxes such as caster bean wax and low molecular weight polyethylenes and the like.

Typical examples of plasticizers which may be admixed with the amide adhesive include dioctyl phthalate, dioctyl sebacate, acetyl tributyl citrate, 2-ethylhexyl diphenyl phosphate, toluene sulfonamide, mineral oil, epoxidized oils, butyl phthalyl butyl glycolate and the like.

Suitable lacquer materials which the interior surface of the metal shell may be coated with prior to the deposition of the amide adhesive include vinyl resins of the class inclusive of polyvinyl chloride, copolymers of vinyl chloride and vinyl acetate, vinyl chloride-vinyl acetate-maleic anhydride terpolymers, vinyl chloride-vinyl acetate-vinyl alcohol terpolymers, vinylidene chloride polymers, and copolymers of vinyl chloride and vinylidene chloride blended with phenol formaldehyde resins and oleoresinous materials exemplified by an unsaturated vegetable oil such as tung oil reacted with polycyclopentadiene.

To illustrate the practice of the present invention, the following examples are given. It is to be understood, however, that the examples are for the purpose of illustration, and the invention is not to be regarded as limited to any of the specific conditions or materials recited therein.

EXAMPLE I

To the interior of a tinplate crown shell having an internal shell diameter of 1.054 inches and preheated to 120° C., to which had been previously applied a lacquer composed of a polycyclopentadiene tung oil rosin reaction product, was applied an adhesive composition consisting of the reaction product of 4,4'-bis(4-hydroxyphenyl) pentanoic acid (DPA), a dimerized soybean oil acid, and ethylene diamine, the DPA and dimerized soybean oil acid having been reacted with the ethylene diamine at a total acid-to-amide mole ratio of 1:1, the concentration of DPA in the amide reaction product being about 7% by weight of the total amide reaction product, the reaction product having the following physical properties:

| | |
|---|---|
| Ring and ball softening point _____° C__ | 100 |
| Specific gravity _____ | 0.990 |
| Amine value _____ | 8.5 |
| Acid value _____ | 3.75 |

The adhesive amide composition was heated to 150° C. prior to its addition to the crown shell. The heated amide adhesive was manually applied to the interior of the heated crown shell with a dauber-type applicator in the amounts of 20 to 30 milligrams of adhesive per crown shell. After the addition of the adhesive composition, a one-inch wide open-mesh fiber glass scrim cloth was superimposed over the adhesive material, which was followed by the insertion of a cork disc into the interior of the crown shell. Pressure was applied to the cork-lined crowns by a spring-loaded plunger to firmly seal the cork disc to the interior of the crown shell.

To demonstrate the outstanding improvement in the adhesion properties exhibited by cork liners bonded to crown shells in accordance with the practice of the present invention, the adhesion properties of the cork-lined crown shells of the present invention were determined before aging and after aging for 30-day and 60-day intervals in an air atmosphere at 38° C. and 90% relative humidity, and were compared with the adhesion determined on identical cork-lined crown shells, the cork liners being bonded to the lacquered crown shells with equivalent amounts of polyamide adhesives outside the scope of the present invention.

The first of these comparison or control amide adhesives, hereinafter designated as Polyamide A, was the reaction product of a dimerized soybean oil acid and ethylene diamine having the following properties:

| | |
|---|---|
| Ring and ball softening point _____° C__ | 98 |
| Amine value _____ | 5.1 |
| Acid value _____ | 3.1 |

The second of these control amide adhesives, hereinafter designated Polyamide B, was also the reaction product of a dimerized soybean oil acid and ethylene diamine having the following properties:

| | |
|---|---|
| Ring and ball softening point _____° C__ | 110 |
| Amine value _____ | 4.0 |
| Acid value _____ | 4.0 |

As further demonstration of the improvement in adhesion properties exhibited by cork liners bonded to crown shells in accordance with the practice of the present invention, a conventional egg albumin adhesive was substituted for the DPA-soybean oil acid-ethylene diamine reaction product as an adhesive for bonding the cork liner to the lacquered crown shell.

Adhesion was determined using a Wilkens-Anderson Pull Tester whereby the assembled crowns were inserted in a stationary upper clamping device and the protruding edge of the fiber glass scrim cloth clamped into the movable lower jaw of the tester. The tester was then activated to cause the lower jaw to move at a speed of 3 inches per minute to separate the cork liner from the shell. Bond strength was measured as the force in ounces required to completely separate the cork liner from the interior of the crown.

The bond strengths of cork liners bonded to crown shells in accordance with the practice of the present invention, as well as cork liners bonded to crown shells using the control adhesives. (Tests designated by the symbol "C") are recorded in Table I below.

The crown shells were used to seal bottles containing a carbonated cola drink, and the bottles were stored at 38° C. for 1-, 2- and 3-month intervals. Eighteen bottles were sealed with each crown shell type for each time interval.

TABLE I

| | | Cork Liner Adhesion (oz.) | | |
|---|---|---|---|---|
| | | After aging at— | | |
| | | 23° C. | 38° C. | 90% RH |
| Test No. | Adhesive composition | 0 days | 30 days | 60 days |
| 1 | 100% Reaction product of DPA, dimerized soybean oil acid and ethylene diamine. | 51 | 76 | 71 |
| 2 | 90% Reaction product of DPA, dimerized soybean oil acid, and ethylene diamine plus 10% 2-ethylhexyl diphenyl phosphate. | 48 | 85 | 77 |
| 3 | 80% Reaction product of DPA, dimerized soybean oil acid and ethylene diamine plus 20% EVA [1]. | 67 | 80 | 70 |
| C₁ | 80% Polyamide A plus 20% EVA | 80 | 47 | 39 |
| C₂ | 80% Polyamide B plus 20% EVA | 65 | 41 | 31 |
| C₃ | 100% Albumin | 49 | 39 | 41 |

[1] Ethylene/vinyl acetate copolymer having a vinyl acetate content of 18% and a melt index of 150.

By referring to Table I, it is at once apparent that the cork liners bonded to lacquered crown shells in accordance with the present invention (Test Nos. 1 through 3) show a remarkable improvement in the retention of the adhesion properties when compared with cork liners bonded to lacquered crown shells with adhesive materials outside the scope of the present invention (Test Nos. $C_1$ through $C_3$).

EXAMPLE II

Cork liners were bonded to crown shells in accordance

After the end of the storage period, the crown shells were removed from the bottles and the cork liners removed from the crown shells and examined for black discoloration on both sides of the liner.

For purposes of comparison, cork liners bonded to crown shells using a conventional egg albumin adhesive were used to seal bottles containing a carbonated cola drink in accordance with the procedure of Example II. The results of these tests are recorded in Table II below.

TABLE II

| | | | | | Discoloration Observed in Cork Liner (Out of 18 Samples) | | | | |
|---|---|---|---|---|---|---|---|---|---|
| | Crown type | Adhesive | No. of months | Face or Back | None | Trace | Slight | Moderate | Considerable |
| Test number: | | | | | | | | | |
| A | I | DPA | 1 | Face | 18 | | | | |
| | | | | Back | 17 | 1 | | | |
| B | I | DPA | 2 | Face | 18 | | | | |
| | | | | Back | 16 | 2 | | | |
| C | I | DPA | 3 | Face | 16 | 2 | | | |
| | | | | Back | 8 | 8 | 2 | | |
| D | II | DPA | 1 | Face | 18 | | | | |
| | | | | Back | 16 | 2 | | | |
| E | II | DPA | 2 | Face | 18 | | | | |
| | | | | Back | 15 | 3 | | | |
| F | II | DPA | 3 | Face | 18 | | | | |
| | | | | Back | 10 | 8 | | | |
| G | I | Albumin | 1 | Face | 16 | 2 | | | |
| | | | | Back | 2 | 9 | 7 | | |
| H | I | do | 2 | Face | 10 | 4 | 4 | | |
| | | | | Back | | 6 | 6 | 6 | |
| I | I | do | 3 | Face | 8 | 2 | 6 | 2 | |
| | | | | Back | | 2 | 4 | 8 | 4 |
| J | II | do | 1 | Face | 18 | | | | |
| | | | | Back | 2 | 9 | 7 | | |
| K | II | do | 2 | Face | 17 | 1 | | | |
| | | | | Back | 2 | 11 | 5 | | |
| L | II | do | 3 | Face | 15 | 3 | | | |
| | | | | Back | 2 | 14 | 2 | | | with the procedure of Example I using the DPA-dimerized soybean oil acid-ethylene diamine amide reaction product (hereinafter referred to as DPA adhesive).

The crown shells consisted of two types:

Type I in which the interior of the crown shell was coated with a lacquer composed of a polycyclopentadiene rosin tung oil reaction product; and Type II in which the interior of the crown shell was coated with a lacquer composed of a phenol formaldehyde modified vinyl chloride-vinyl acetate-maleic anhydride terpolymer.

The amide adhesive heated to 150° C. was applied to the interior of the heated lacquer coated crown shell with a rotary-spoke, dauber-type applicator in amounts of 20 to 30 milligrams of adhesive per crown shell. After the addition of the adhesive composition, a cork disc was superimposed over the adhesive material. After insertion of the cork disc, the cork-lined crowns were transferred to an unheated rotating turret where pressure was applied to the cork liners by spring-loaded plungers to firmly seal the cork disc to the interior of the crown shell.

Results similar to the foregoing may also be obtained when other reaction products prepared from 4,4'-bis hydroxyphenyl) pentanoic acids, dimerized vegetable oil acids and aliphatic polyamines mentioned above are utilized in a similar manner in place of those set forth in the above examples.

What is claimed is:

1. A container closure comprising a metal shell having a lacquer coating on the interior surface thereof, a cork liner disposed therein and bonded to the lacquered interior surface of the shell by an adhesive composition comprising a major amount of an amide reaction product prepared by heating a low molecular weight aliphatic polyamine having the formula

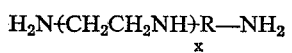

wherein R is an alkylene group having 2 to 6 carbon atoms and $x$ is an integer from 0 to 3, with a mixture of acids consisting of a 4,4'-bis (hydroxyaryl) pentanoic acid and a dimer acid of a vegetable oil acid having 18 to 22 carbon atoms, the mole ratio of said amine to said mixture of acids being about 1:1, the amide having an amine value of less than 10 and an acid value of less than 10, the bis (hydroxyaryl) pentanoic acid comprising about 5% to about 30% by weight of the amide reaction product.

2. The container closure of claim 1 wherein the lacquer coating is a polycyclopentadiene tung oil rosin reaction product.

3. The container closure of claim 1 wherein the lacquer coating is a phenol formaldehyde modified vinyl chloride-vinyl acetate-maleic anhydride terpolymer.

4. The container closure of claim 1 wherein the 4,4'-bis (hydroxyaryl) pentanoic acid is 4,4'-bis (4-hydroxyphenyl) pentanoic acid.

5. The container closure of claim 1 wherein the dimerized vegetable oil acid is a dimerized soybean oil acid.

6. The container closure of claim 1 wherein the aliphatic polyamine constituent is ethylene diamine.

7. In the method of making closure containers of the type comprising a metal shell having a cork liner, the step comprising bonding said cork liner to the interior surface of said shell with an adhesive composition comprising a major amount of an amide reaction product prepared by heating a low molecular weight aliphatic polyamine having the formula

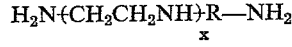

wherein R is an alkylene group having 2 to 6 carbon atoms and $x$ is an integer from 0 to 3, with a mixture of acids consisting of 4,4'-bis (hydroxyaryl) pentanoic acid and a dimer acid of a fatty acid having 18 to 22 carbon atoms, the mole ratio of said amine to said mixture of acids being about 1:1, the amide having an amine value of less than 10 and an acid value of less than 10, the bis (hydroxyaryl) pentanoic acid comprising about 5% to about 30% by weight of the amide reaction product.

8. The method of claim 7 wherein the dimer acid is the dimer acid of soybean oil acid.

9. The method of claim 7 wherein the aliphatic polyamine is ethylene diamine.

10. The method of claim 7 wherein the 4,4'-bis (hydroxyaryl) pentanoic acid is 4,4'-bis (4-hydroxyphenyl) pentanoic acid.

References Cited

UNITED STATES PATENTS 2,907,728  10/1957  Greenlee _____ 260—19
3,183,144  5/1965   Caviglia _____ 161—252

JOHN T. GOOLKASIAN, Primary Examiner

J. D. SMITH, Assistant Examiner

U.S. Cl. X.R.

156—262, 331; 161—40, 42, 213, 223, 227, 230; 215—40; 260—18